(12) United States Patent
Goyal et al.

(10) Patent No.: US 12,401,400 B2
(45) Date of Patent: Aug. 26, 2025

(54) EARLY CHANNEL STATE INFORMATION ACQUISITION FOR TARGET CELL IN LAYER ONE / LAYER TWO INTER-CELL MOBILITY

(71) Applicant: Nokia Technologies Oy, Espoo (FI)

(72) Inventors: Sanjay Goyal, Denville, NJ (US); Timo Koskela, Oulu (FI); Keeth Saliya Jayasinghe Laddu, Espoo (FI); Ahmad Awada, Munich (DE); Ali Karimidehkordi, Munich (DE); Panagiotis Spapis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 456 days.

(21) Appl. No.: 17/985,699

(22) Filed: Nov. 11, 2022

(65) Prior Publication Data
US 2024/0162956 A1 May 16, 2024

(51) Int. Cl.
*H04W 24/10* (2009.01)
*H04B 7/06* (2006.01)

(52) U.S. Cl.
CPC ........... *H04B 7/0626* (2013.01); *H04B 7/063* (2013.01); *H04B 7/0632* (2013.01); *H04W 24/10* (2013.01)

(58) Field of Classification Search
CPC .... H04B 7/0626; H04B 7/063; H04B 7/0632; H04W 24/10; H04W 36/0094; H04W 36/087; H04W 36/0058
See application file for complete search history.

(56) References Cited

U.S. PATENT DOCUMENTS

| 2016/0360537 A1* | 12/2016 | Palenius | H04W 76/27 |
| 2019/0215756 A1* | 7/2019 | Park | H04W 36/305 |
| 2021/0144569 A1* | 5/2021 | Zhou | H04W 24/08 |
| 2021/0274403 A1* | 9/2021 | Chen | H04W 36/0085 |

(Continued)

FOREIGN PATENT DOCUMENTS

| WO | 2018/175891 A1 | 9/2018 |
| WO | 2022/154876 A1 | 7/2022 |

OTHER PUBLICATIONS

Extended European Search Report dated Apr. 15, 2024 corresponding to European Patent Application No. 23208096.0.

(Continued)

*Primary Examiner* — Fahmida S Chowdhury
(74) *Attorney, Agent, or Firm* — SQUIRE PATTON BOGGS (US) LLP (57) ABSTRACT

Systems, methods, apparatuses, and computer program products for the acquisition and provision of channel state information for a target cell early in the process of layer one/layer two inter-cell mobility are provided. For example, a method can include a user equipment receiving a first configuration of layer one measurement and reporting together with a second configuration for channel state information measurement and reporting for a candidate cell. The method can also include reporting layer one measurement according to the first configuration. The method can further include performing channel state information measurements according to the second configuration. The method can additionally include reporting the channel state information measurements to a network element to be forwarded to the candidate cell.

18 Claims, 3 Drawing Sheets

(56) References Cited

U.S. PATENT DOCUMENTS

| | | | |
|---|---|---|---|
| 2022/0225188 A1* | 7/2022 | Pezeshki | H04W 36/0061 |
| 2023/0019909 A1* | 1/2023 | Zhang | H04L 5/0051 |
| 2023/0413130 A1* | 12/2023 | Zhou | H04W 36/0094 |
| 2024/0162956 A1* | 5/2024 | Goyal | H04B 7/063 |

OTHER PUBLICATIONS

Nokia et al., "Discussion on L1 enhancements for L1/L2-triggered mobility," 3GPP Draft; R1-2211306, 3GPP TSG RAN WG1 #111, Toulouse, France, Nov. 14-18, 2022, Nov. 7, 2022, XP052221870.
Huawei et al., "Overview of Rel-17 work areas for NR and LTE," 3GPP Draft; RP-191486, 3GPP TSG RAN Meeting #84, Newport Beach, USA, Jun. 3-6, 2019, Jun. 4, 2019, XP051748412.
3GPP TS 38.214 V17.3.0 (Sep. 2022), Technical Specification, 3rd Generation Partnership Project; Technical Specification Group Radio Access Network; NR; Physical layer procedures for data (Release 17), Sep. 2022.
3GPP TS 38.473 V17.2.0 (Sep. 2022), Technical Specification, 3rd Generation Partnership Project; Technical Specification Group Radio Access Network; NG-RAN; F1 application protocol (F1AP) (Release 17), Sep. 2022.
3GPP TS 38.300 V17.2.0 (Sep. 2022), Technical Specification, 3rd Generation Partnership Project; Technical Specification Group Radio Access Network; NR; NR and NG-RAN Overall Description; Stage 2 (Release 17), Sep. 2022.
Media Tek, "Revised WID on Further NR mobility enhancements," RP-222332, 3GPP TSG RAN Meeting #97-e, Electronic Meeting, Sep. 12-16, 2022.
European Office Action issued in corresponding European Patent Application No. 23 208 096.0-1206 on May 16, 2025.

* cited by examiner

EARLY CHANNEL STATE INFORMATION ACQUISITION FOR TARGET CELL IN LAYER ONE / LAYER TWO INTER-CELL MOBILITY

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to the acquisition and provision of channel state information for a target cell early in the process of layer one/layer two inter-cell mobility.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus may include at least one processor and at least memory storing instructions. The instructions, when executed by the at least one processor, may cause the apparatus at least to perform receiving a first configuration of layer one measurement and reporting for a candidate cell. The instructions, when executed by the at least one processor, may also cause the apparatus at least to perform receiving a second configuration for channel state information measurement and reporting for a candidate cell. The instructions, when executed by the at least one processor, may further cause the apparatus at least to perform and report layer one measurement according to the first configuration. The instructions, when executed by the at least one processor, may additionally cause the apparatus at least to perform channel state information measurements according to the second configuration. The instructions, when executed by the at least one processor, may also cause the apparatus at least to perform reporting the channel state information measurements to a network element according to the second configuration to be forwarded to the candidate cell.

An embodiment may be directed to an apparatus. The apparatus may include at least one processor and at least memory storing instructions. The instructions, when executed by the at least one processor, may cause the apparatus at least to perform receiving layer one measurements of a candidate cell. The instructions, when executed by the at least one processor, may also cause the apparatus at least to perform receiving a report of channel state information measurements from a user equipment to be forwarded to the candidate cell. The instructions, when executed by the at least one processor, may further cause the apparatus at least to perform forwarding the channel state information measurements toward the candidate cell.

An embodiment may be directed to an apparatus. The apparatus may include at least one processor and at least memory storing instructions. The instructions, when executed by the at least one processor, may cause the apparatus at least to perform generating a configuration message comprising a first configuration of layer one measurement and reporting for a candidate cell. The instructions, when executed by the at least one processor, may further cause the apparatus at least to perform generating a configuration message with a second configuration for channel state information measurement and reporting for a candidate cell. The instructions, when executed by the at least one processor, may additionally cause the apparatus at least to perform sending the configuration messages to the user equipment. The instructions, when executed by the at least one processor, may also cause the apparatus at least to perform receiving, based on the configuration message, the channel state information measurements to be forwarded to the candidate cell. The instructions, when executed by the at least one processor, may further cause the apparatus at least to perform forwarding the channel state information measurements to the candidate cell.

An embodiment may be directed to an apparatus. The apparatus may include at least one processor and at least memory storing instructions. The instructions, when executed by the at least one processor, may cause the apparatus at least to perform receiving a context setup request regarding a user equipment to be switched to being served by the apparatus. The instructions, when executed by the at least one processor, may also cause the apparatus at least to perform receiving channel state information measurements forwarded from the user equipment after the context setup request but prior to beginning to serve the user equipment. The instructions, when executed by the at least one processor, may further cause the apparatus at least to perform serving the user equipment based on the channel state information measurements after a cell switch.

An embodiment may be directed to a method. The method can include receiving a first configuration of layer one measurement and reporting for a candidate cell. The method may also include receiving a second configuration for channel state information measurement and reporting for a candidate cell. The method may further include performing and reporting layer one measurement according to the first configuration. The method may additionally include performing channel state information measurements according to the second configuration. The method may also include reporting the channel state information measurements to a network element according to the second configuration to be forwarded to the candidate cell.

An embodiment may be directed to a method. The method can include receiving layer one measurements of a candidate cell. The method can also include receiving a report of channel state information measurements from a user equipment to be forwarded to the candidate cell. The method may further include forwarding the channel state information measurements toward the candidate cell.

An embodiment may be directed to a method. The method can include generating a configuration message comprising a first configuration of layer one measurement and reporting for a candidate cell. The method may also include generating a configuration message with a second configuration for channel state information measurement and reporting for a candidate cell. The method further include sending the configuration messages to the user equipment. The method may additionally include receiving, based on the configuration message, the channel state information measurements to be forwarded to the candidate cell. The method may also include forwarding the channel state information measurements to the candidate cell.

An embodiment may be directed to a method. The method can include receiving a context setup request regarding a user equipment to be switched to being served by a distributed unit. The method may also include receiving channel state information measurements forwarded from a user equipment after the context setup request but prior to beginning to serve the user equipment. The method may further include serving the user equipment based on the channel state information measurements after a cell switch.

An embodiment can be directed to an apparatus. The apparatus can include means for receiving a first configuration of layer one measurement and reporting for a candidate cell. The apparatus may also include means for receiving a second configuration for channel state information measurement and reporting for a candidate cell. The apparatus may further include means for performing and reporting layer one measurement according to the first configuration. The apparatus may additionally include means for performing channel state information measurements according to the second configuration. The apparatus may also include means for reporting the channel state information measurements to a network element according to the second configuration to be forwarded to the candidate cell.

An embodiment can be directed to an apparatus. The apparatus can include means for receiving layer one measurements of a candidate cell. The apparatus can also include means for receiving a report of channel state information measurements from a user equipment to be forwarded to the candidate cell. The apparatus may further include means for forwarding the channel state information measurements toward the candidate cell.

An embodiment can be directed to an apparatus. The apparatus can include means for generating a configuration message comprising a first configuration of layer one measurement and reporting for a candidate cell. The apparatus may also include means for generating a configuration message with a second configuration for channel state information measurement and reporting for a candidate cell. The apparatus may further include means for sending the configuration messages to the user equipment. The apparatus may additionally include means for receiving, based on the configuration message, the channel state information measurements to be forwarded to the candidate cell. The apparatus may also include means for forwarding the channel state information measurements to the candidate cell.

An embodiment can be directed to an apparatus. The apparatus can include means for receiving a context setup request regarding a user equipment to be switched to being served by the apparatus. The apparatus may also include means for receiving channel state information measurements forwarded from a user equipment after the context setup request but prior to beginning to serve the user equipment. The apparatus may further include means for serving the user equipment based on the channel state information measurements after a cell switch.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing the acquisition and provision of channel state information for a target cell early in the process of layer one/layer two inter-cell mobility, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments may relate to providing mechanisms for early channel state information (CSI) acquisition for one or more candidate cells for layer 1/layer 2 (L1/L2) triggered mobility (LTM). Moreover, certain embodiments may reduce the delay for the target cell to obtain the CSI measurements.

In the following discussion, the terms candidate cell and candidate target cell are used interchangeably. A target cell may refer to a candidate cell which is selected for the UE to handover to based on LTM decision and which becomes the UE's serving cell after the cell switch. Likewise, serving cell and serving distributed unit (DU) are used interchangeably. Additionally, Layer 1/Layer 2 (L1/2) triggered mobility, L1/2 inter-cell mobility, L1/2 handover, and lower layer (L1/2) mobility may be used interchangeably. Further, target cell and target DU may be used interchangeably herein. Further, the terms "cell", "node", "gNB", "network", or other similar language throughout this specification may be used interchangeably. Further, a L1/2 signal, message, or command sent by the network which is used to trigger cell switch at the UE is referred as cell switch command herein. Further, as used herein, a serving DU may control at least one cell, among which one cell may be a serving cell. Thus, in certain example embodiments described herein, when a serving DU sends or receives, the serving DU may send or receive data using a radio link of the serving cell. This same concept regarding the serving DU may also be applicable for a target cell/DU described herein.

To maintain high data transmission efficiency and reliability in the process of fast cell switch, early CSI acquisition for the candidate cell(s) may be beneficial so that the UE may be able to use a high data link with the target cell immediately after the cell switch. There may be one or more candidate cells for the UE before the cell switch, from which one candidate cell may be selected as a target cell which may become the serving cell of the UE after the cell switch. Early CSI acquisition may be performed with a set of candidate cells which may include the target cell. Certain embodiments provide a procedure that may enable CSI acquisition for a candidate cell before the cell switch command is received by the UE in LTM, for example in release 18 (Rel-18) LTM.

In order to reduce the mobility latency, there may be benefit to specify mechanisms and procedures for LTM. For example, there may be benefit to specifying mechanisms and procedures of L1/L2 based inter-cell mobility for mobility latency reduction. Mechanisms and procedures can include configuration and maintenance for multiple candidate cells to allow fast application of configurations for candidate cells. Mechanisms and procedures can also include a dynamic switch mechanism among candidate serving cells, including special cell (SpCell) and secondary cell (SCell), for potentially applicable scenarios based on L1/L2 signaling. Mechanisms and procedures can further include L1 enhancements for inter-cell beam management, including L1 measurement and reporting, and beam indication.

Timing advance (TA) management and central unit (CU)-DU interface signaling to support L1/L2 mobility, may also be beneficial. Standalone, carrier aggregation (CA) and new radio (NR) dual connectivity (NR-DC) case with serving cell change within one carrier group (CG) as well as intra-DU case and intra-CU inter-DU case, applicable for standalone and CA may also be beneficial.

Mechanisms and procedures can include mechanism for both intra-frequency and inter-frequency, for both frequency range 1 (FR1) and frequency range 2 (FR2), as well as for cases where source and target cells are either synchronized or non-synchronized.

Certain procedures prior to the reception of L1/L2 cell switch command may help to reduce handover delay/interruption. Such procedures may include downlink (DL) synchronization for candidate cell(s), tracking reference signal (TRS) tracking for candidate cell(s), CSI acquisition for candidate cell(s), and activation or selection of TCI states for candidate cell(s).

Channel State Information framework is described in section 5.2 of third generation partnership project (3GPP) technical specification (TS) 38.214.

Certain embodiments, as applied to Rel-18 LTM, may help to maintain high data transmission efficiency and reliability in the process of fast cell switch. Early CSI acquisition for the candidate cell(s) may be beneficial so that the UE may be able to use high data link with the target cell immediately after the cell switch.

To determine CSI of a candidate cell, for example a candidate cell for being the target cell, CSI reference signals (CSI-RSs) of the candidate cell may be suitably configured for the UE to make CSI measurements. Additionally, certain embodiments relate to how the CSI measurements may be reported to the candidate cell without incurring any significant interruption to the serving cell communication with the UE and without incurring any significant over the air (OTA) and inter-cell/DU signaling overhead.

If the target cell/DU starts CSI measurements including higher layer parameters after the cell change, then during the time the CSI measurements take place by the UE and reported to the target cell, the target cell may not be able to make optimal RRM decisions. Therefore, certain embodiments may reduce the delay for the target cell to obtain the CSI measurements that might be useful for RRM decision.

Certain embodiments may reduce the delay for the target cell to obtain the CSI measurements that might be useful for RRM decision such as scheduling, or the like. Thus, certain embodiments may improve the technical operation of the communication system.

Figure 1:
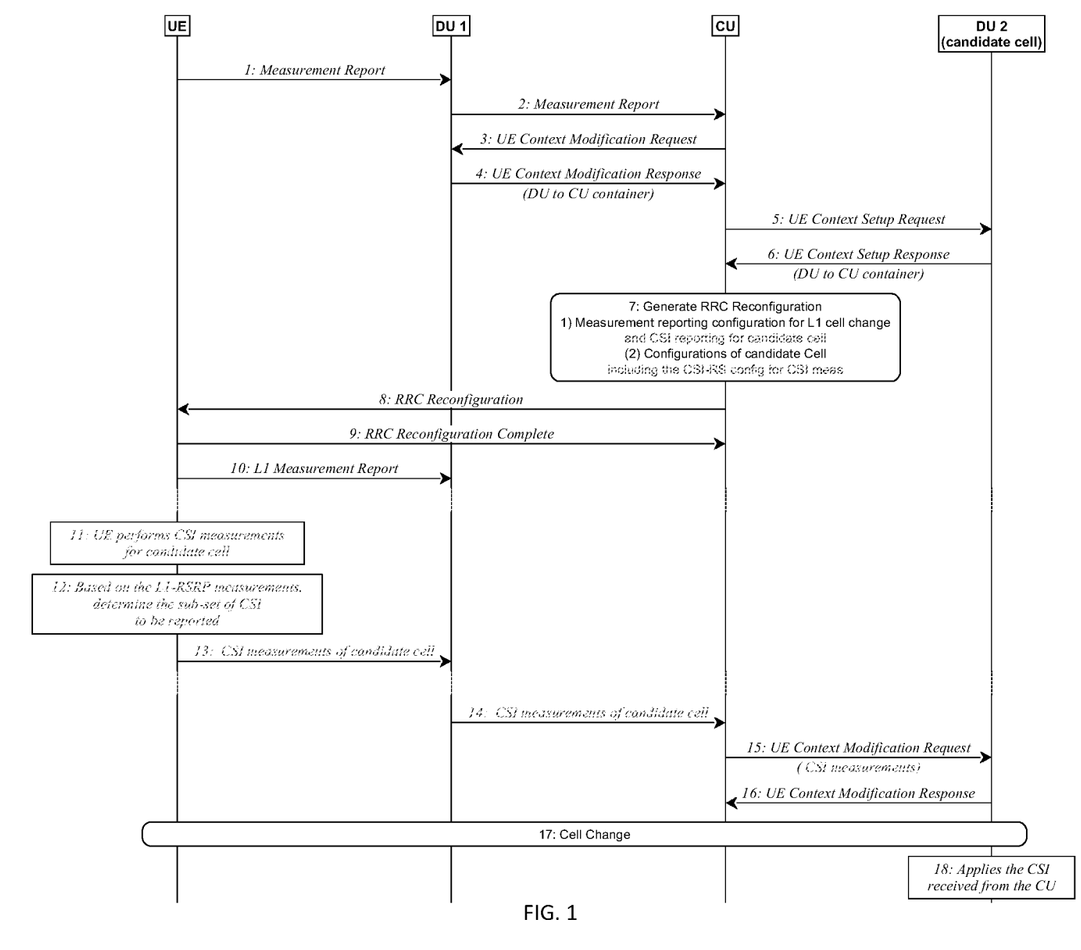
FIG. 1 illustrates channel state information acquisition of a candidate cell using user-equipment-based filtering, according to certain embodiments.

Certain embodiments may enable CSI acquisition for a candidate cell before the cell switch, for example before the cell switch command is received by the UE. Together with L1 beam measurements and reporting configuration for one or more candidate cells for cell change, the UE may be configured with a CSI measurement and reporting configuration for CSI acquisition. L1 beam measurement for cell change may include L1 beam measurements, e.g., L1-reference signal received power (RSRP) or L1-signal to interference and noise ratio (SINR) measurements, which may be used to determine the cell switch decision. To perform L1 beam measurements and reporting, the UE may be configured with reference signal configuration including SSB resources or/and CSI-RS resources of one or more candidate cells to make measurements and a reporting configuration to report the L1 beam measurements to the serving cell. For CSI derivation for one or more candidate cells, one or more CSI-RS resources of one or more candidate cells may be configured for CSI measurements and a configuration to report the CSI measurements of one or more candidate cells to the serving cell may be configured to the UE. In one example, configuration for L1 beam measurements and reporting and configuration for CSI measurements and reporting may be given separately for example in separate messages. In another example, configuration for L1 beam measurements and reporting and configuration for CSI measurements and reporting may be given in the same message. In one example, CSI-RSs of a candidate cell for L1 beam measurements and CSI derivation may refer to the same resource configuration. In another example, CSI-RSs of a candidate cell for L1 beam measurements and CSI derivation may be different/separate resource configurations. For example, the network may configure the UE with L1 beam measurement and reporting for cell change and CSI measurement and reporting for CSI acquisition in one message, as shown for example at procedure 8 in FIGS. 1 and 2, based the on message generated at procedure 7 in FIGS. 1 and 2, respectively. The CSI-RS resources may be associated with measured candidate cells. The CSI measurements may be used to determine at least one or more CSI quantities such as rank indicator (RI), precoding matrix indicator (PMI), channel quality indicator (CQI), layer indicator (LI). CSI measurements for a candidate cell may be configured to report to the serving cell where the reporting configuration may include the uplink resource configuration of the serving cell to send the CSI measurements. Additionally, the serving cell receiving the CSI reports of one or more candidate cells can forward the CSI reports to the associated target cell/DU directly or indirectly via the CU. In FIG. 1, such a procedure is illustrated by DU 1 (DU managing the UE's serving cell) receiving CSI measurements at 13 and forwarding them to the CU at 14 and the CU forwarding them on to DU 2 (DU managing a candidate cell) at 15. Similarly, in FIG. 2, such a procedure is illustrated by DU 1 receiving the CSI measurements at 12 and forwarding them on to the CU at 14, which forwards them on to DU 2 at 15.

With the method of certain embodiments, the target cell/DU may be able to use a higher layer parameter included in the CSI report before triggering further CSI measurements after cell switch. The UE can use high data link with the target cell immediately after the cell switch. Accordingly, certain embodiments may enable CSI acquisition for a candidate cell before the cell switch for example, before cell switch trigger/command is received by the UE, in Rel-18 LTM.

In certain embodiments, for a UE that performs L1 beam measurements and reporting for one or more candidate cells, the UE may be configured or indicated with a CSI measurement and reporting configuration that allows CSI-RS measurements associated with at least one candidate cell. CSI-RS resources associated with the candidate cell may be measured and the measurements may be used to determine one or more CSI quantities such as RI, PMI, CQI. The UE may also be configured with or indicated UL resources, such as physical uplink control channel (PUCCH)/physical uplink shared channel (PUSCH), on serving cell/DU to report CSI quantities of one or more candidate cells.

CSI measurements and reporting can follow periodic, aperiodic, and/or semi-persistent CSI-RS and can rely on suitable reporting mechanisms. For periodic CSI reporting, reporting may be only applicable or triggered when there is an additional configuration/indication related to the LTM.

CSI measurement and reporting towards the serving cell may not be valid after the cell switch towards a target candidate cell. In one example, when CSI-RS based beam measurements use the same CSI reporting configuration, CSI quantities such as RI, PMI, CQI can also be configured to report together with the beam measurements, for example CSI-RS resource index (CRI), layer one reference signal received power (L1-RSRP)/layer 1 signal to interference plus noise ratio (L1-SINR), at least for the best beams (e.g., highest L1-RSRP/L1-SINR).

In another example, when CSI-RS based beam measurements use the same CSI reporting configuration, CSI quantities such as RI, PMI, CQI can be configured to report in later reporting instances of the same CSI reporting configuration, for example after initial beam measurement only reporting.

In certain embodiments, there can be UE-based filtering of CSI reports. In one example, the UE can be configured to filter/select specific CSI measurements to be reported.

In certain embodiments, at least one or all or average L1-RSRP/L1-SINR measurement(s) for the candidate cell for which the CSI measurements are reported, may be required to be above a network configured threshold value. In other words, if the one or all or average of L1-RSRP/L1-SINR measurement(s) for the candidate cell is not above the network-configured threshold value, the CSI measurements of that candidate cell may be filtered from being reported. Event-triggered reporting may be used to report CSI measurements for a candidate cell where an event may be configured based on a condition related to L1 beam measurements of that candidate cell. In one example, such a CSI report can be sent in a MAC-CE to the serving cell.

In one example, CSI reporting for a candidate cell can only be reported for only N (>=1) best beams, i.e., the beams with N strongest L1-RSRPs/L1-SINRs or N strongest L1-RSRPs/L1-SINRs above a network (NW) configured L1-RSRP threshold.

In another example, UE may not be required to perform CSI reporting if the measurement with the quasi-co-located (QCL) source RS, such as SSB, of the at least one CSI-RS for which the CSI measurement is configured, is not above a L1-RSRP-threshold/L1-SINR-threshold, such as detection threshold or other configured threshold.

After receiving CSI report(s) of one or more candidate cells, the serving cell forwards the CSI report(s) to the associated target cell/DU, directly or indirectly via the CU.

Network-based filtering of CSI reports can also be performed. In certain embodiments, the serving cell may determine whether or not to forward any CSI measurements based on L1-RSRSP/L1-SINR threshold. If the UE provides L1-RSRP/L1-SINR measurements for a beam of a candidate cell above a threshold limit, the serving cell may start to forward the associated CSI measurements to the candidate cell. Additionally, in case the UE then reports lower values for L1-RSRP/L1-SINR than a threshold, the CSI measurements may not be forwarded. There may also be some hysteresis/filtering for the L1-RSRP/L1-SINR that is compared to a threshold. In one example, if there are more than N cells for which the CSI measurements would be forwarded, the serving may select subset of cells for which the CSI measurements are forwarded. Examples may include number of reported beams of a candidate cell above a threshold, average L1-RSRP/L1-SINR over all the beam indices of a candidate cell above a threshold, or the like.

In one example, the serving cell may filter the CSI reports based on UE-based filtering of CSI reports not being configured. In another example, the serving cell may filter the CSI reports in addition to UE-based filtering. For example, the UE may report CSI reports for a candidate cell only for N (>=1) best beams, such as the beams with N strongest L1-RSRPs/L1-SINRs. The serving cell may then forward the CSI measurements to only those candidate cells for which the N is above a threshold.

A candidate cell that receives the CSI measurement from the serving cell may apply the CSI to communicate with the UE after the cell switch. In addition, the candidate cell can use these measurements to make optimal RRM decisions.

In addition to forwarding CSI measurements to candidate cell(s), serving cell may use such measurements to select a candidate cell for the cell switch/handover.

FIG. 1 illustrates channel state information acquisition of a candidate cell using user-equipment-based filtering, according to certain embodiments. As shown in FIG. 1, at 1 a user equipment can send a measurement report to a first distributed unit (DU-1) where the UE's serving cell belongs to. The DU 1 can send the measurement report to the central unit (CU), at 2. At 3, the CU can send a context modification request related to the UE to DU-1. Accordingly, at 4, DU-1 can send a UE context modification response in a DU to CU container to the CU.

At 5, the CU can send a UE context setup request regarding the UE to a second distributed unit (DU 2) where a candidate cell for the UE belongs to. DU 2 can send a UE context setup response in a DU to CU container to the CU at 6.

At 7, the CU can generate an RRC reconfiguration message. The RRC reconfiguration message can include at least two aspects. The RRC reconfiguration can include a measurement reporting configuration for layer one (L1) cell change which may include configuration for reporting of L1 measurements of a candidate cell, and CSI reporting, for example, configuration to report CSI, for a candidate cell. Likewise, the RRC reconfiguration message can include configuration of the candidate cell, including RS (SSB/CSI-RS) configuration for L1 measurements and CSI-RS configuration for CSI measurements for the candidate cell.

At 8, the RRC reconfiguration can be sent to the UE, and at 9, the UE can acknowledge the RRC reconfiguration with an RRC reconfiguration complete message.

At 10, the UE may provide an L1 measurement report to DU 1. At 11, the UE can perform CSI measurements of a candidate cell. In this case, the candidate cell may be DU 2.

At 12, based on the L1-RSRP measurements, the UE may determine a subset of CSI measurements to be reported. At 13, the UE may send CSI measurements of the candidate cell that pass any of the filters applied at 12. In certain cases, the filtered list could be the entire list, if the entire set of CSI measurements pass the filters applied by the UE.

At 14, the DU 1 can forward the CSI measurements of the candidate cell to the CU. At 15, the CU can forward the CSI measurements to DU 2 in a context modification request for the UE. At 16, DU 2 can provide a UE context modification response to the CU. At 17, a cell change can occur. Accordingly, immediately at 18, DU 2 can apply the CSI received from the CU to begin communicating with the UE.

Figure 2:
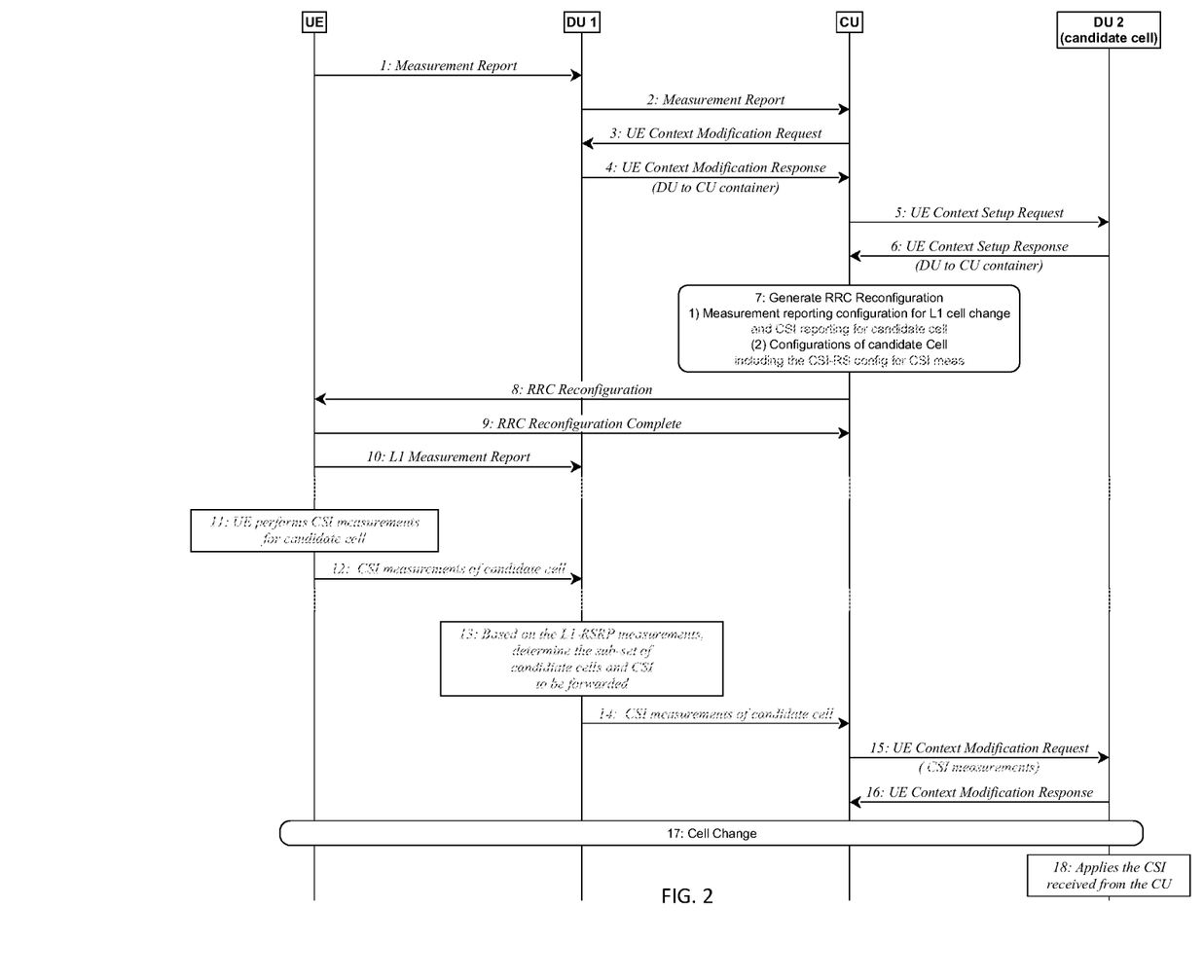
FIG. 2 illustrates channel state information acquisition of a candidate cell using network-based filtering, according to certain embodiments.

FIG. 2 illustrates channel state information acquisition of a candidate cell using network-based filtering, according to certain embodiments. As can be seen from a comparison of FIGS. 1 and 2, procedures 1 through 11 and of FIG. 2 can correspond to the same procedures in FIG. 1.

In FIG. 2, however, there may not be a determination at the UE side of which sub-set of CSI measurements to reported. Instead, at 12, the UE may provide all the CSI measurements of all the configured candidate cells. At 13 in FIG. 2, DU 1 can, based on the L1-RSRP measurements, determine a subset of candidate cells or/and the associated CSI measurements to be forwarded. Thus, in FIG. 2 the filtering may take place at DU 1 rather than at the UE. The remaining procedures 14 through 18 may be the same as in FIG. 1.

FIGS. 1 and 2 individually illustrates user-equipment-based filtering and network-based filtering, but both kinds of filtering can be combined. A signaling diagram for an approach in which both UE and network-based filtering of CSI reporting are performed may be the combination of illustrated procedures from the signaling diagrams of FIGS. 1 and 2. In particular, procedure 12 of FIG. 1 and procedure 13 of FIG. 2 can be both be present in combination with the other procedures described above.

Figure 3:
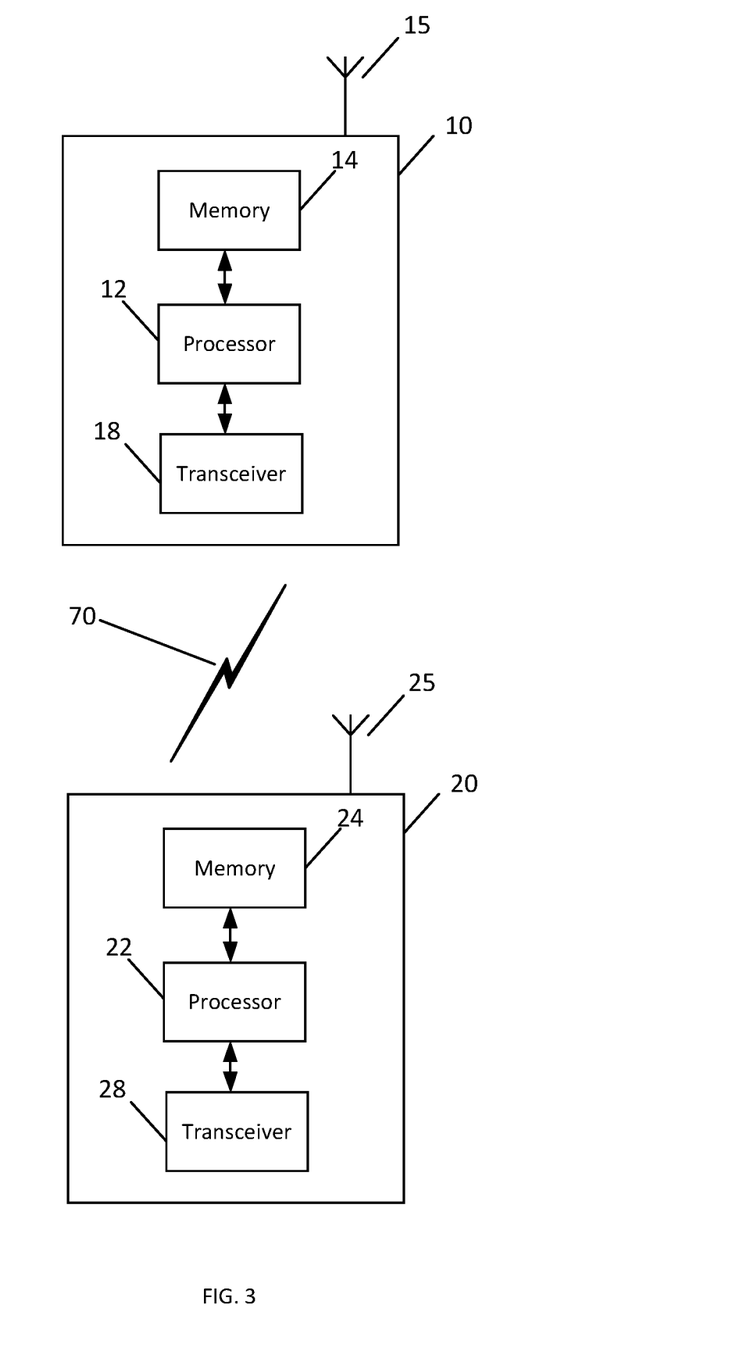
FIG. 3 illustrates an example block diagram of a system, according to an embodiment.

FIG. 3 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as an LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 3.

As illustrated in the example of FIG. 3, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 3, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to the acquisition and provision of channel state information for a target cell early in the process of layer one/layer two inter-cell mobility.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RANI), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1 and 2, or any other method described herein. In some embodiments, as discussed herein, apparatus 10 may be configured to perform a procedure relating to providing the acquisition and provision of channel state information for a target cell early in the process of layer one/layer two inter-cell mobility, for example.

FIG. 3 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3.

As illustrated in the example of FIG. 3, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1 and 2, or any other method described herein. For example, in an embodiment, apparatus 20 may be controlled to perform a process relating to providing the acquisition and provision of channel state information for a target cell early in the process of layer one/layer two inter-cell mobility, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments enable the early CSI acquisition for one or more candidate cells in LTM that reduces the delay for the target cell to obtain the CSI measurements that might be useful for RRM decision such as scheduling, or the like. Certain embodiments permit CSI measurements to be performed for one or more candidate cells and to be reported back to the associated candidate cells with minimum interruption to serving cell data communication. Certain embodiments permit filtering at UE or/and serving cell to select only relevant CSI measurement. Such filtering may further minimize the inter-cell/DU coordination, thereby reducing signaling overhead. More particularly, certain embodiments may permit the early CSI acquisition for one or more candidate cells for LTM and the provision of the CSI measurements reported to the candidate DU. This early acquisition and provision of CSI reporting may reduce the delay for the target cell to obtain the CSI measurements. The CSI measurements may be needed for RRM decision such as scheduling, or the like. The CSI measurement reporting to a candidate cell via serving cell may minimize the interruption to serving cell data communication.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium. The term "non-transitory" as used herein, is a limitation of the medium itself (i.e. tangible, not a signal) as opposed to a limitation on data storage persistency (e.g. RAM vs. ROM).

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

BWP Bandwidth Part
CQI Channel Quality Indicator
CSI Channel State Information
CSI-RS Channel State Information Reference Signal
CU Centralized Unit
DU Distributed Unit
L1 Layer 1
L2 Layer 2
LI Layer indicator
LTM L1/2-triggered Mobility
RI Rank Indicator
RRM Radio Resource Management
RS Reference Signal
RSRP Reference Signal Received Power
PMI Precoding Matrix Indicator
PDCCH Physical Downlink Control Channel
PDSCH Physical Downlink Shared Channel
PUCCH Physical Uplink Control Channel
PUSCH Physical Uplink Shared Channel
SINR Signal to Interference and Noise Ratio
SSB Synchronization Block

We claim:
1. An apparatus, comprising:
   at least one processor; and
   at least one memory storing instructions that, when executed by the at least one processor, cause the apparatus at least to perform
   receiving a first configuration of layer one measurement and reporting for a candidate cell;
   receiving a second configuration for channel state information measurement and reporting for a candidate cell;

performing and reporting layer one measurement according to the first configuration;

performing channel state information measurements according to the second configuration; and reporting the channel state information measurements to a network element according to the second configuration to be forwarded to the candidate cell.

2. The apparatus of claim 1, wherein the first configuration and the second configuration are received in a same message.

3. The apparatus of claim 1, wherein the layer one measurements comprise a layer one reference signal received power or a layer one signal to interference and noise ratio using a synchronization signal block or a channel state information resource signal.

4. The apparatus of claim 1, wherein the channel state information measurements comprise one or more of rank indicator, precoding matrix indicator, channel quality indicator, layer indicator using a channel state information resource signal.

5. The apparatus of claim 1, wherein the second configuration includes at least one channel state information resource signal configuration of the candidate cell for CSI measurements and a resource configuration of the serving cell for reporting the measurements.

6. The apparatus of claim 1, wherein the instructions, when executed by the at least one processor, cause the apparatus at least to perform filtering the channel state information measurements according to a filter condition, based on the second configuration, to provide a sub-set of the channel state information measurements, wherein the reporting the channel state information measurements comprises exclusively reporting the subset.

7. The apparatus of claim 6, wherein the filter condition comprises a value of a given layer one measurement of the candidate cell configured based on the first configuration being above a network-configured threshold value in order to be included in the reporting.

8. The apparatus of claim 6, wherein the filter condition comprises a predetermined maximum number of best beams of the candidate cell, determined based on the layer one measurements according to the first configuration, to be reported or a predetermined maximum number of above-threshold beams of the candidate cell, determined based on the layer one measurements according to the first configuration, to be reported.

9. An apparatus, comprising:

at least one processor; and at least one memory storing instructions that, when executed by the at least one processor, cause the apparatus at least to perform receiving layer one measurements of a candidate cell based on a first configuration of layer one measurement and reporting for the candidate cell;

receiving a report of channel state information measurements from a user equipment to be forwarded to the candidate cell based on a second configuration for channel state information measurement and reporting for the candidate cell; and forwarding the channel state information measurements toward the candidate cell.

10. The apparatus of claim 9, wherein the instructions, when executed by the at least one processor, cause the apparatus at least to perform filtering the channel state information measurements according to a predetermined filter condition, to provide a sub-set of the channel state information measurements, wherein the forwarding the channel state information measurements comprises exclusively reporting the subset.

11. The apparatus of claim 10, wherein the filter condition comprises a value of a layer one measurement of the candidate cell being above a network-configured threshold value in order to be included in the reporting.

12. The apparatus of claim 10, wherein the filter condition comprises a predetermined maximum number of best beams of the candidate cell, determined based on the layer one measurements, to be reported or a predetermined maximum number of above-threshold beams of the candidate cell, determined based on the layer one measurements, to be reported.

13. An apparatus, comprising:

at least one processor; and at least one memory storing instructions that, when executed by the at least one processor, cause the apparatus at least to perform generating a configuration message comprising a first configuration of layer one measurement and reporting for a candidate cell;

generating a configuration message with a second configuration for channel state information measurement and reporting for a candidate cell;

sending the configuration messages to the user equipment;

receiving, based on the configuration message, the channel state information measurements to be forwarded to the candidate cell; and forwarding the channel state information measurements to the candidate cell.

14. The apparatus of claim 13, wherein the configuration message comprising the first configuration is a same message as the configuration message comprising the second configuration.

15. A method, comprising:

receiving a first configuration of layer one measurement and reporting for a candidate cell;

receiving a second configuration for channel state information measurement and reporting for a candidate cell;

performing and reporting layer one measurement according to the first configuration;

performing channel state information measurements according to the second configuration; and reporting the channel state information measurements to a network element according to the second configuration to be forwarded to the candidate cell.

16. The method of claim 15, wherein the first configuration and the second configuration are received in a same message.

17. The method of claim 15, wherein the layer one measurements comprise a layer one reference signal received power or a layer one signal to interference and noise ratio using a synchronization signal block or a channel state information resource signal.

18. The method of claim 15, wherein the channel state information measurements comprise one or more of rank indicator, precoding matrix indicator, channel quality indicator, layer indicator using a channel state information resource signal.

* * * * *